(12) United States Patent
Runde

(10) Patent No.: US 7,232,188 B2
(45) Date of Patent: Jun. 19, 2007

(54) HEAD RESTRAINT GUIDE SYSTEM

(75) Inventor: David M. Runde, Beverly Hills, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 0 days.

(21) Appl. No.: 11/455,460

(22) Filed: Jun. 19, 2006

(65) Prior Publication Data

US 2006/0244298 A1 Nov. 2, 2006

Related U.S. Application Data

(62) Division of application No. 11/034,895, filed on Jan. 13, 2005, now Pat. No. 7,086,701.

(60) Provisional application No. 60/536,207, filed on Jan. 13, 2004.

(51) Int. Cl.
*A47C 7/38* (2006.01)

(52) U.S. Cl. .................................... 297/410; 297/391

(58) Field of Classification Search ............... 297/391, 297/404, 410
See application file for complete search history.

(56) References Cited

U.S. PATENT DOCUMENTS

| | | | | |
|---|---|---|---|---|
| 4,423,905 A | * | 1/1984 | Ray | .............. 297/391 |
| 4,679,850 A | | 7/1987 | Bianchi et al. | |
| 5,397,170 A | * | 3/1995 | Shrock | .............. 297/391 X |
| 5,445,434 A | | 8/1995 | Kohut | |
| 5,711,579 A | | 1/1998 | Albrecht | |
| 5,713,635 A | | 2/1998 | DeFilippo | |
| 5,738,412 A | | 4/1998 | Aufrere et al. | |
| 5,788,250 A | | 8/1998 | Masters et al. | |
| 5,927,813 A | * | 7/1999 | Nemoto | .............. 297/391 |
| 5,992,939 A | | 11/1999 | Gass et al. | |
| 6,224,158 B1 | | 5/2001 | Hann | |
| 6,296,316 B1 | | 10/2001 | Hann | |
| 6,460,926 B1 | | 10/2002 | Neale | |
| 6,641,219 B2 | | 11/2003 | Meshke et al. | |
| 6,733,079 B2 | * | 5/2004 | Gans et al. | .............. 297/410 |
| 7,086,701 B2 | * | 8/2006 | Runde | .............. 297/410 |
| 2002/0024247 A1 | * | 2/2002 | Mori | .............. 297/391 |
| 2002/0093231 A1 | | 7/2002 | Estrada et al. | |
| 2002/0157235 A1 | | 10/2002 | Napolitano, Jr. et al. | |
| 2003/0151290 A1 | * | 8/2003 | Gans et al. | .............. 297/410 |
| 2003/0173811 A1 | | 9/2003 | Pausch | |

* cited by examiner

*Primary Examiner*—Rodney B. White
(74) *Attorney, Agent, or Firm*—Clark Hill PLC

(57) ABSTRACT

A head restraint guide system is provided to reduce or eliminate contact points between an armature of a head restraint and a housing in a vehicle seat assembly. The housing extends through a seat back frame. In a first embodiment, a retainer is secured to the housing and a washer is seated within the retainer. A retaining cap closes and maintains the washer within the retainer. The armature extends through the guide system contacting only the washer, thus eliminating vibrations and noise due to contact between the armature and the attachment tube. The washer comprises a non-rigid material, preferably felt. In a second embodiment, an elongated sleeve comprising a non-rigid material, preferably felt, is seated within the housing. The sleeve receives and surrounds the armature to eliminate contact points between the armature and the housing, thereby eliminating vibrations and noise therebetween.

5 Claims, 4 Drawing Sheets

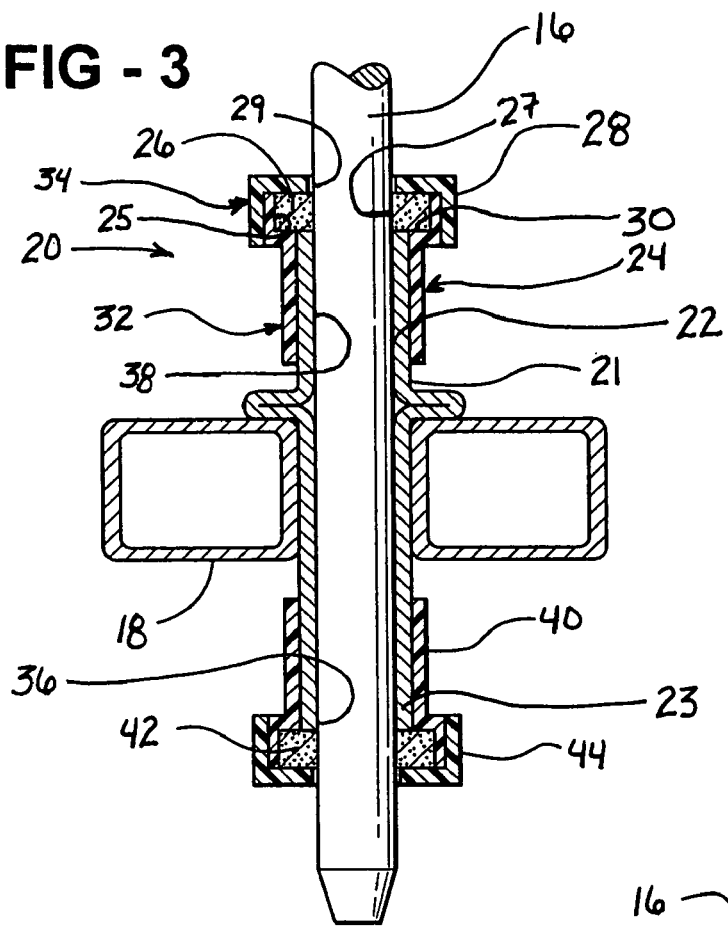
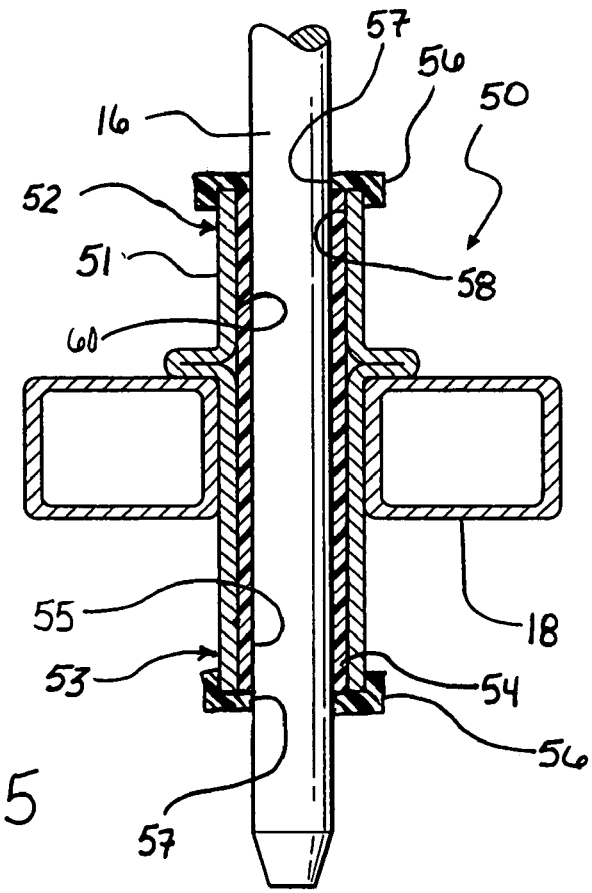

HEAD RESTRAINT GUIDE SYSTEM

RELATED APPLICATION

This application is a divisional application of U.S. patent application Ser. No. 11/034,895, now U.S. Pat. No. 7,086,701 B2, filed on Jan. 13, 2005, which claims priority to and all the benefits of U.S. Provisional Application No. 60/536,207 filed on Jan. 13, 2004.

FIELD OF INVENTION

The invention relates to a head restraint for an automotive vehicle seat and more particularly, to a head restraint guide for slidably guiding head restraint armatures during vertical adjustment of the head restraint relative to the seat.

DESCRIPTION OF RELATED ART

Head restraint structures mounted on vehicle seat backs to provide occupant comfort and safety are well known in the art. Typically, at least one armature extends from the head restraint to attach the head restraint to the seat back. The seat back includes a frame, typically having an attachment tube extending through a portion of the frame for receiving the armature. A head restraint guide system is often included to allow vertical adjustment of the head restraint according to occupant preference. Prior art guide systems usually utilize a plastic sleeve inserted within the attachment tube for guiding the armature. Unfortunately, insufficient or uneven frictional engagement between the armature and the sleeve causes excessive noise from the buzz, squeaks and rattles of the armature within the sleeve.

Manufacturers have attempted to solve this problem by adding internal or external ribs to the sleeve to reduce the contact area between the armature and the sleeve. Internal ribs guide the armature as it travels through the sleeve while external ribs restrain the sleeve within the attachment tube. Such ribs are typically made of plastic and the wearing of the ribs over time causes looseness, thus changing the tolerance between the armature and the sleeve and between the sleeve and the attachment tube. This change in tolerance leads to an increase in buzz, squeaks, and rattles, and also varies the adjustment effort required to move the head restraint over time. Additionally, plastic guide systems are greatly affected by temperature variances, typically increasing adjusting effort with decreased temperature.

It is therefore a goal of the invention to provide a head restraint guide system affording a toleranced fit between the attachment tube and the armature which prevents unwanted vibrations by sufficiently restraining the armature within the attachment tube while still allowing easy vertical adjustment of the head restraint. It is a further goal of the invention to provide a head restraint guide system which does not wear away over time, thus providing consistent vibration damping and adjustment effort throughout the life of the vehicle. Finally, it is also a goal of the invention to provide a head restraint guide system substantially unaffected by temperature variations.

SUMMARY OF THE INVENTION

According to a first embodiment of the invention, a head restraint guide for coupling and guiding an elongated armature of a head restraint to a vehicle seat back is provided including a housing, a retainer, a resilient washer and a retainer cap. The housing is fixedly secured to the seat back for slidably receiving the armature and having an inner wall extending between first and second opposing ends defining an aperture therethrough. The retainer is secured to a least one of the ends of the housing and has a center bore aligned axially with the aperture of the housing. The resilient washer is seated within the bore of the retainer and has a center bore for slidably receiving the armature therethrough, the center bore has a width smaller than the width of the armature to frictionally guide the armature through the housing and dampen the vibrations between the armature and the housing. The retainer cap is coupled to the retainer for closing the washer therein.

According to a second embodiment of the invention, a head restraint guide for coupling and guiding an elongated armature of a head restraint to a vehicle seat back is provided including a housing, a resilient sleeve and a retainer cap. The housing is fixedly secured to the seat back for slidably receiving the armature and having an inner wall extending between first and second opposing ends defining an aperture therethrough. The resilient sleeve is elongated and is seated with the aperture of the housing and has a center bore for slidably receiving the armature therethough, wherein the center bore has a width smaller than the width of the armature to frictionally guide the armature through the housing and dampen vibrations between the armature and the housing. The retainer cap is coupled to each of the ends of the housing for retaining the sleeve with in the housing and between the two ends.

BRIEF DESCRIPTION OF THE DRAWINGS

Other advantages of the invention will be readily appreciated as the same becomes better understood by reference to the following detailed description when considered in connection with the accompanying drawings, wherein:

FIG. 3 is a cross-sectional side view of the assembled first embodiment;

FIG. 5 is a cross-sectional side view of the assembled second embodiment.

DETAILED DESCRIPTION OF THE PREFERRED EMBODIMENT

Figure 1:
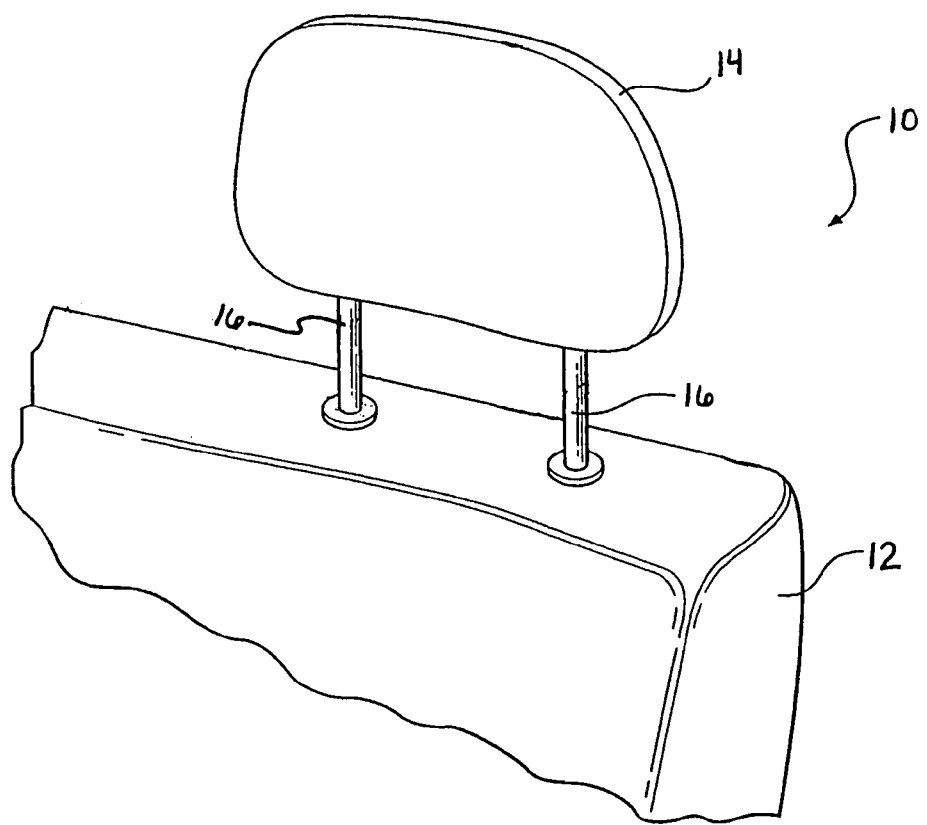
FIG. 1 is a fragmentary front perspective view of a head restraint and seat assembly.

Referring to FIG. 1, a partial view of a typical seat assembly 10 is shown. The seat assembly 10 includes a seat back 12, a seat cushion (not shown), and a head restraint 14. The head restraint 14 is adjustably attached to the seat back 12 via a pair of spaced apart and parallel armatures 16. The armatures 16 are slidably attached to a seat back frame 18 (shown in FIG. 2) within the seat back 12. A head restraint guide 20 (show in FIG. 2) facilitates the adjustable attachment of the head restraint 14 relative to the seat back frame 18.

Figure 2:
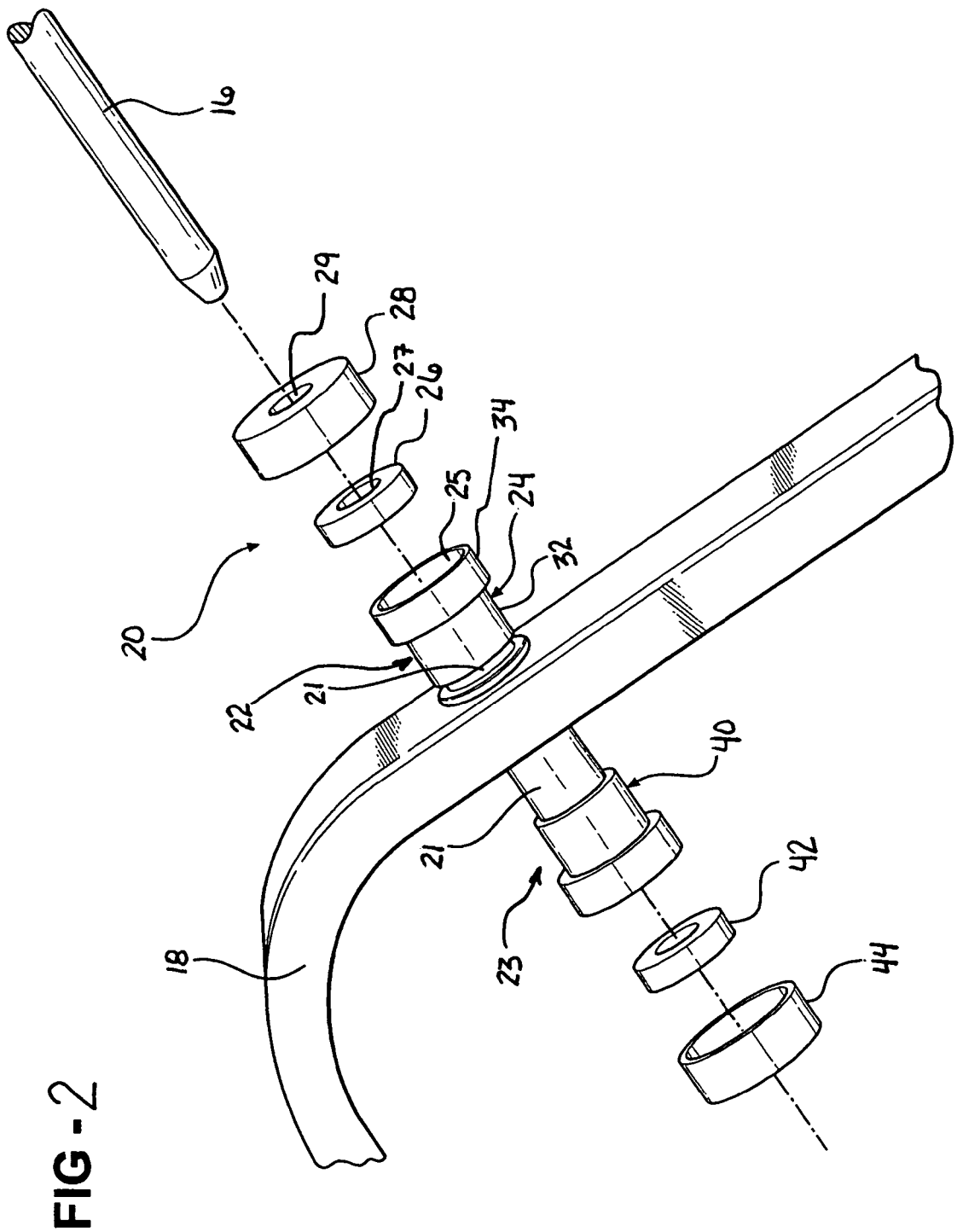
FIG. 2 is an exploded perspective view of a first embodiment of a head restraint guide system of the invention.

Referring now to FIG. 2, there is illustrated a first embodiment of a head restraint guide 20 of the invention. The seat assembly 10 typically includes a pair of head restraint guide systems 20, one for each of the armatures 16. However, for simplicity only one of the guide systems will be described in detail. A housing 21, having a first end 22 and an opposite second end 23, extends through the seat back frame 18 for receiving one of the head restraint armatures 16 through the first end 22 to attach the head restraint 14 to the seat assembly 10. The housing 21 has an axially aligned aperture 36 extending from the first end 22 to the second end 23, thereby defining an inner wall 38. While the housing 21 is shown as a cylindrical tube, one will appreciate that a variety of shapes could be used. Additionally, the seat back frame 18 is preferably U-shaped as shown, but a seat back frame of any configuration may be used without compromising the inventive concept.

The guide 20 further comprises a retainer 24, a washer 26, and a retainer cap 28. Specifically, the retainer 24 comprises a retainer base 32 and an opposite retainer head 34, with the head 34 having a larger outside diameter than the base 32. The retainer base 32 is secured to the first end 22 of the housing 21. The retainer 24 has an axially aligned retainer bore 25 for receiving the armature 16, the diameter of the retainer bore 25 being larger in the head 34 than in the base 32. Further, the diameter of the retainer bore 25 in the head 34 is larger than the outside diameter of the base 32, thereby defining a relief 30. The washer 26 is seated on the relief 30 of the retainer 24. Alternatively, the washer 26 abuts the retainer head 34 instead of being seated within it. The retainer cap 28 fits around the retainer head 34 to maintain the position of the washer 26 securely within the housing 21. The retainer 24 and the retainer cap 28 may be separate parts which connect together, for example, in a snap fit relationship to retain the washer 26 therebetween, or the retainer 24 and retainer cap 28 may be injection molded, with the washer 26 being insert molded therein.

The retainer cap 28 has an axially aligned cap bore 29 for receiving the armature 16. The washer 26 also includes a center bore 27 for receiving the armature 16, with the center bore 27 having a diameter slightly smaller than the diameter of the armature 16. As such, the washer 26 provides a constant contact surface and dampener between the armature 16 and the guide 20 as the armature 16, and thus the head restraint 14, moves vertically with respect to the seat back 12.

The washer 26 comprises any non-rigid material with noise and vibration insulating properties, and is preferably a high density natural or man-made felt. The washer 26, being resilient and non-rigid, conforms to the inside of the retainer cap 28 or the retainer 24 in which it is seated, while also snugly surrounding the armature 16 to hold it in position, thus providing excellent tolerances between the armature 16 and the guide 20. Since the washer 26 is, however, non-rigid, resilient and compressible, it can accommodate a broad range of armature 16 sizes without any adjustment. Also, the non-rigid characteristics of the washer 26 allows the armature 16 to move within the guide 20 with relatively little effort, thus allowing easy vertical adjustment of the head restraint 14. Additionally, the guide 20 operates with high consistency, since felt is affected little by friction and/or temperature variances.

As shown in FIG. 2, the guide 20 further includes a second retainer 40, a second washer 42, and a second retainer cap 44 attached to the second end 23 of the housing 21 in a substantially identical manner as that described above. Using two washers 26, 42 provides the armature 16 with two contact points between the armature 16 and the guide 20, thus better securing the armature 16 within the guide 20 and providing better vibration damping characteristics.

Figure 4:
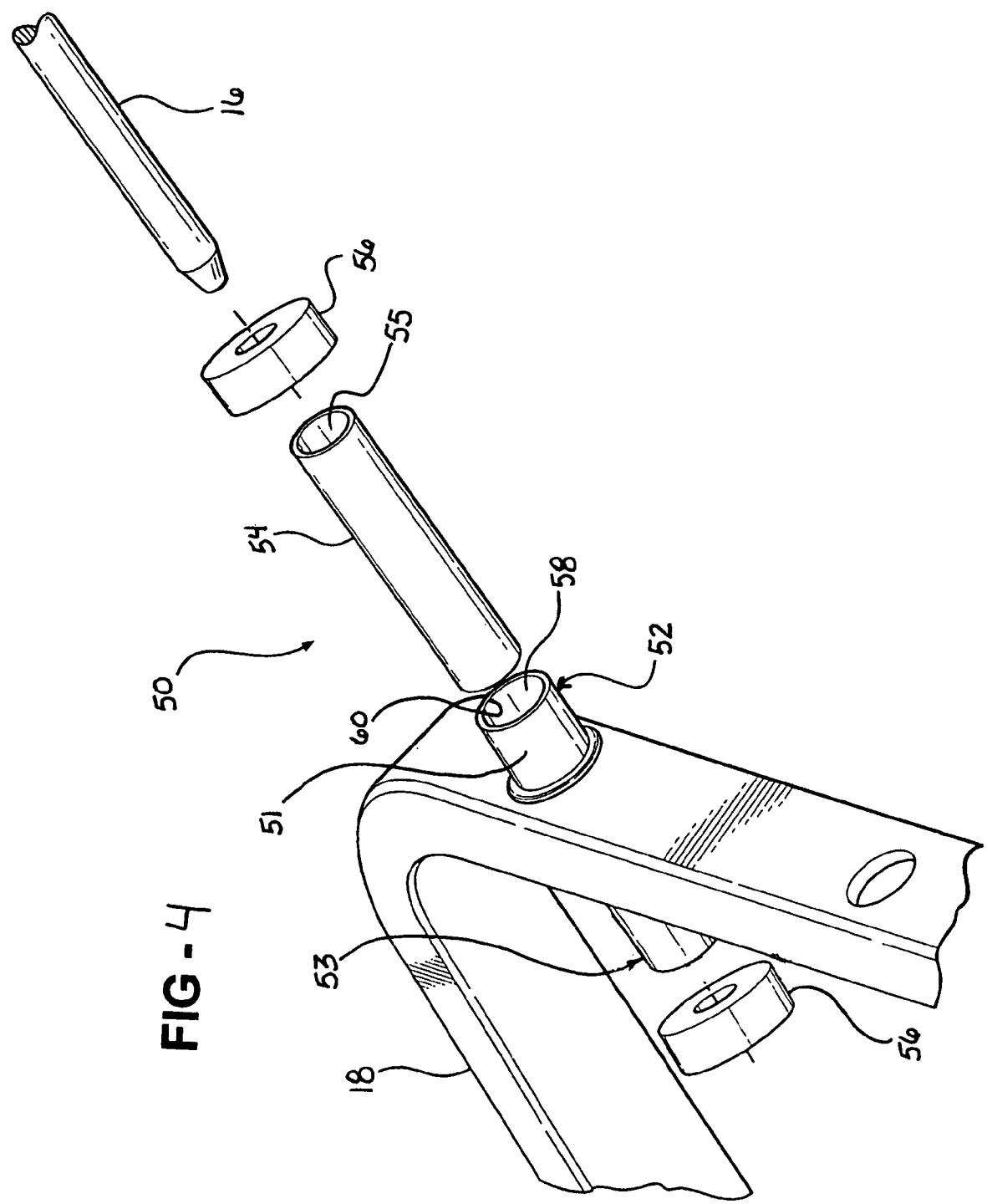
FIG. 4 is an exploded perspective view of a second embodiment of a head restraint guide system of the invention.

Turning now to FIG. 4, a second embodiment of a head restraint guide 50 of the invention is illustrated. The guide 50 comprises a sleeve 54 seated within the housing 51 and a pair of retainer caps 56. The housing 51 is structurally similar to the housing 21 of the first embodiment, having a first end 52 and an opposite second end 53. The housing 51 further includes an axially aligned aperture 58, thereby defining an inner wall 60, to receive the sleeve 54 therein. The housing 51 is shown as a cylindrical tube, but again a variety of shapes could be used. Similarly, the sleeve 54 is shown as an elongated cylinder, but could be any shape that would fit within the housing 51.

The sleeve 54 extends longitudinally with the housing 51 between the first end 52 and second end 53. The sleeve 54 includes a center bore 55 for receiving the armature 16, again with the center bore 55 having a diameter slightly smaller than the diameter of the armature 16. Preferably, the sleeve 54 extends fully through the housing 51, from the first end 52 to the second end 53. In an alternative embodiment, the sleeve 54 may extend only partially through the housing 51 without compromising the inventive concept.

The retainer caps 56 attach to the ends 52, 53 of the housing 51 to secure and retain the sleeve 54 within the housing 51. Each retainer cap 56 includes a cap bore 57 such that the armature 16 may pass therethrough and into the sleeve 54. The sleeve 54 comprises any material suitable for use as the washer 26 of the first embodiment 10 of the invention, namely, any non-rigid, resilient material with noise and vibration insulating properties, preferably a high density natural or man-made felt. The sleeve 54 thus conforms to the inner wall 60 of the housing 51 while snugly surrounding the armature 16 as described above.

The invention has been described here in an illustrative manner, and it is to be understood that the terminology used is intended to be in the nature of words or description rather than limitation. Many modifications and variations of the invention are possible in light of the above teachings. For example, the housing 21, and therefore the retainer 24, washer 26 and retainer cap 28, need not be cylindrical. It is only necessary that they fit together to provide a passageway for the armature 16. It is, therefore, to be understood that within the scope of the appended claims, the invention may be practiced other than as specifically enumerated within the description.

What is claimed is:

1. A head restraint guide for coupling and guiding an elongated armature of a head restraint to a vehicle seat back wherein the armature defines an armature width, said guide comprising:

a housing adapted to be fixedly secured to the seat back for slidably receiving the armature, said housing having an inner wall extending between first and second opposing ends defining an aperture therethrough;

an elongated, resilient sleeve seated within said aperture of said housing; and a retainer cap connected to each of said ends of said housing retaining said sleeve within said housing and between said ends;

said sleeve including a center bore for slidably receiving the armature therethrough, wherein said center bore has a width smaller than the width of the armature to frictionally guide the armature through said housing and dampen vibrations between the armature and said housing.

2. A head restraint guide as set forth in claim 1 wherein said retainer cap includes a cap bore for slidably allowing the armature therethrough.

3. A head restraint guide as set forth in claim 2 wherein said cap bore of said retainer cap has a width larger than the armature width.

4. A head restraint guide as set forth in claim 3 wherein said sleeve extends from said first end to said second end of said housing.

5. A head restraint guide as set forth in claim 4 wherein said sleeve is manufactured from felt.

* * * * *